US007591904B2

(12) United States Patent
Bertz et al.

(10) Patent No.: US 7,591,904 B2
(45) Date of Patent: Sep. 22, 2009

(54) SYSTEM AND METHOD FOR MANUFACTURING COLOR-COATED OPTICAL FIBER

(75) Inventors: Mark Bertz, Alpharetta, GA (US);
Robert C. Moore, Roswell, GA (US);
John M. Turnipseed, Lilburn, GA (US);
Shunhe Xiong, Shrewsbury, MA (US)

(73) Assignee: Fueukawa Electric North America, Inc., Norcross, GA (US)

( * ) Notice: Subject to any disclaimer, the term of this patent is extended or adjusted under 35 U.S.C. 154(b) by 828 days.

(21) Appl. No.: 10/947,464

(22) Filed: Sep. 22, 2004

(65) Prior Publication Data
US 2006/0062907 A1    Mar. 23, 2006

(51) Int. Cl.
*B05C 3/12*    (2006.01)
(52) U.S. Cl. .................. 118/420; 118/125; 118/683
(58) Field of Classification Search ................. 118/420, 118/125, 679, 683, 684, 694; 427/163.2
See application file for complete search history.

(56) References Cited

U.S. PATENT DOCUMENTS

| | | | | |
|---|---|---|---|---|
| 3,622,290 | A | * | 11/1971 | Klink et al. .................. 65/453 |
| 4,979,380 | A | * | 12/1990 | Robbins et al. ........... 68/205 R |
| 5,330,786 | A | | 7/1994 | Nanaka |
| 5,935,332 | A | * | 8/1999 | Caucal ...................... 118/429 |
| 5,976,253 | A | | 11/1999 | Rosenkranz |
| 6,044,665 | A | | 4/2000 | Lysson |
| 6,152,068 | A | * | 11/2000 | Colson et al. .................. 118/46 |
| 6,317,553 | B1 | | 11/2001 | Harper, Jr. |
| 6,321,014 | B1 | | 11/2001 | Overton |
| 6,387,814 | B1 | * | 5/2002 | Chen ........................... 438/700 |
| 2001/0024698 | A1 | | 9/2001 | Lin et al. |
| 2005/0058548 | A1 | * | 3/2005 | Thomas et al. ................ 417/43 |

FOREIGN PATENT DOCUMENTS

EP        0 674 950        10/1995

OTHER PUBLICATIONS

Patent Abstrats of Japan, vol. 018, No. 410 (C-1232), Aug. 2, 1994 & JP 06 122535, May 6, 1994 abstract, figure 1.

* cited by examiner

*Primary Examiner*—Brenda A Lamb

(57) ABSTRACT

Embodiments of the invention include a system and method for color-coating an optical fiber. The system includes a flow controller that controllably delivers and mixes color concentrate from one or more color concentrate reservoirs with a coating material, which colored coating material is fed to a coating die through which optical fiber passes. The color concentrate reservoirs are more compact and can be made portable along with the flow controller. Thus, the entire color coating system can travel to any appropriate location in the fiber manufacturing facility, e.g., at any one of a number of draw towers. Such portability allows many different colors to be used at the same draw tower much more easily than conventional arrangements, which typically only have one color line per draw tower. The method includes providing an optical fiber, controllably delivering color concentrate with a coating material to a coating die, coating the optical fiber with the coating die, and curing the coated fiber.

5 Claims, 3 Drawing Sheets

SYSTEM AND METHOD FOR MANUFACTURING COLOR-COATED OPTICAL FIBER

BACKGROUND OF THE INVENTION

1. Field of Invention

The invention relates to optical fiber. More particularly, the invention relates to systems and methods for color-coating optical fiber.

2. Description of Related Art

Optical fibers are thin strands of glass or plastic capable of transmitting optical signals containing relatively large amounts of information over long distances with relatively low attenuation. Optical fibers typically are made by heating and drawing a portion of an optical preform comprising a refractive core surrounded by a protective cladding made of glass or other suitable material. The drawn optical fiber then is protected further by applying one or more clear coating layers made of ultraviolet (UV)-cured or other suitable material. Typically, optical fiber is coated with a first or primary coating layer and a second or secondary coating layer.

Often, to aid in future identification and discrimination of optical fibers, coated optical fibers are colored by coating or top-coating the outer coating layer with a UV-curable ink having one of a plurality of colors, e.g., 12 or more colors. To save time and cost, some fiber manufacturers attempt to coat and color the optical fiber in a single step, i.e., to color the optical fiber during the coating step. See, e.g., U.S. Pat. Nos. 5,330,786; 6,317,553; and 6,321,014. In this manner, a pre-colored coating material is applied to the optical fiber. Typically, the pre-colored coating material is a conventional secondary coating pre-mixed with a color concentrate.

However, such conventional coloring during draw techniques have disadvantages. For example, in conventional coloring during draw arrangements, changing colors requires replacing the ink drum with a different ink drum and purging all the lines between the drum and the coating die. Also, manufacturing colorless optical fiber once a coloring-during-draw arrangement has been set up involves changing the ink drum and purging the lines. Furthermore, if there is not enough ink in the existing drum to coat the fiber drawn from an entire preform, the ink drum must be discarded.

Accordingly, it would be desirable to have available a system and method for coloring optical fiber during draw that overcomes the disadvantages of many conventional coloring during draw arrangements.

SUMMARY OF THE INVENTION

The invention is embodied in a system and method for color-coating an optical fiber. The system includes a flow controller that controllably delivers and mixes color concentrate from one or more color concentrate reservoirs with a coating material, which colored coating material is fed to a coating die through which optical fiber passes. The color concentrate reservoirs are more compact and can be made portable along with the flow controller. Thus, the entire color coating system can travel to any appropriate location in the fiber manufacturing facility, e.g., at any one of a number of draw towers. Such portability allows many different colors to be used at the same draw tower much more easily than conventional arrangements, which typically only have one color line per draw tower. A method for color-coating an optical fiber according to embodiments of the invention includes providing an optical fiber, controllably delivering color concentrate with a coating material to a coating die, coating the optical fiber with the coating die, and curing the coated fiber.

DETAILED DESCRIPTION OF EXEMPLARY EMBODIMENTS

Figure 1:
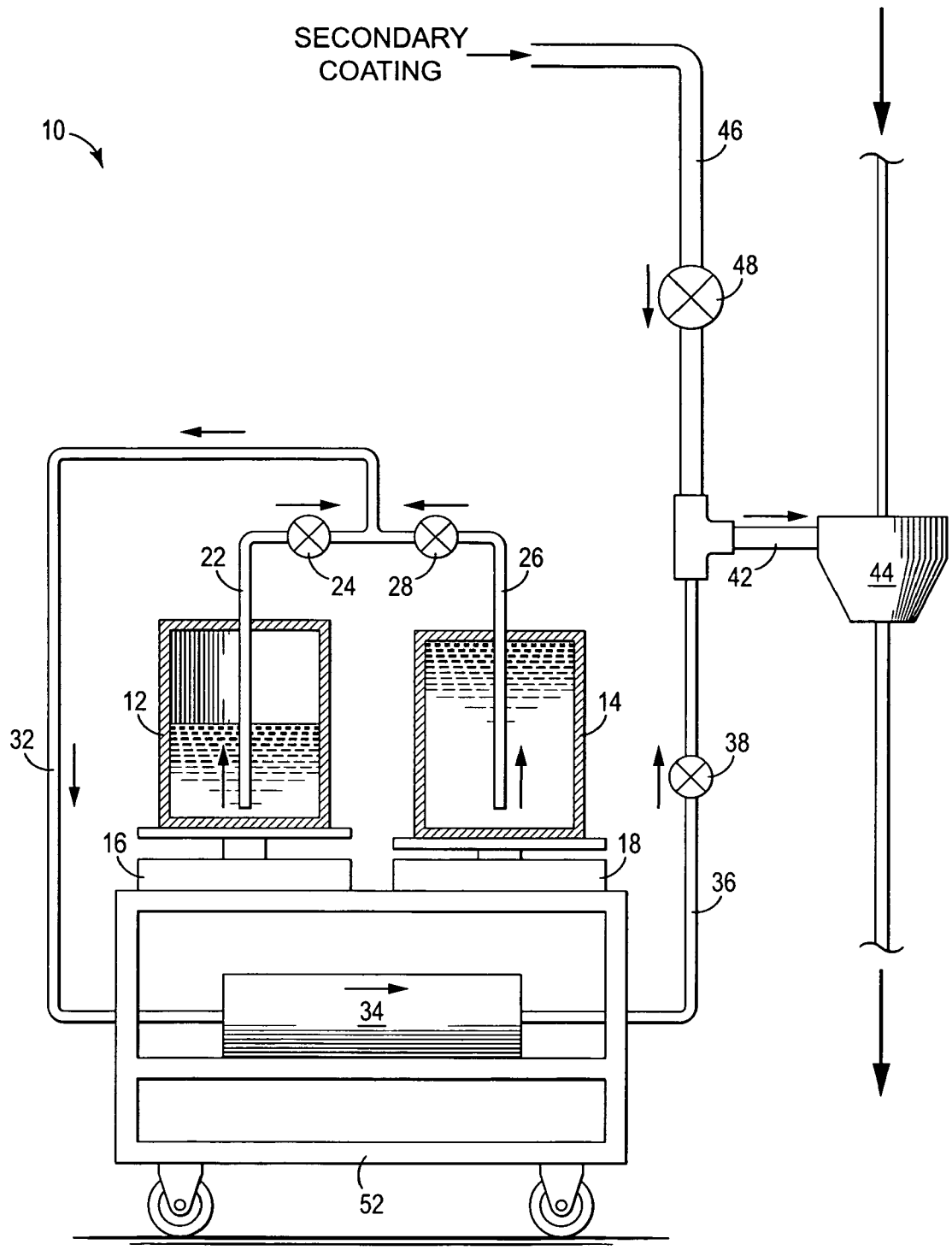
FIG. 1 is a simplified, schematic diagram of a system for color-coating optical fiber according to embodiments of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Optical fiber typically is manufactured by gradually heating an optical fiber preform and drawing the heated portion of the preform into optical fiber. The preform typically is vertically suspended and controllably lowered into a heat source such as a draw furnace, which heats that portion of the preform to approximately 2000-2200° Celsius. As the preform passes through the furnace, the preform gradually softens to the point where optical fiber is drawn from the softened end of the preform.

Once drawn, the optical fiber passes through a cooling unit and then through one or more coating units or dies that apply a clear or colorless, ultraviolet (UV)-curable liquid coating to the optical fiber. The coated optical fiber then passes through a curing device such as a UV source, where the applied coating is cured and hardened. Optionally, additional coatings are applied, such as a colorless secondary coating and/or a colored ink coating. As discussed hereinabove, many optical fiber manufacturers consolidate the manufacturing process by coating and coloring in a single step. Typically, a pre-colored secondary coating is applied to the primary coating and then cured.

Referring now to FIG. 1, shown is a simplified, schematic diagram of a system 10 for color-coating optical fiber according to embodiments of the invention. The system includes one or more reservoirs that initially are filled with color concentrate of the desired coating color. For example, the system 10 includes a first reservoir 12 filled with color concentrate of the desired color coating and a second reservoir 14 filled with color concentrate of the same desired color coating. The use of more than one color concentrate reservoir allows one reservoir to be in use delivering color concentrate while the other reservoir(s) is being de-gassed and refilled. In this manner, the system 10 can run continuously as needed, i.e., the system 10 does not have to be shut down to refill any one of the reservoirs with color concentrate. The reservoirs are placed on one or more scales 16, 18 or other suitable devices that function as level sensors for the color concentrate in each reservoir.

According to embodiments of the invention, the reservoirs are filled with highly-concentrated color rather than the actual color coating. Conventional systems have reservoirs filled with the pre-mixed color coating in the exact concentration used for coating the optical fiber. As will be discussed hereinbelow, according to embodiments of the invention, the color concentrate in the reservoirs will be mixed controllably with conventional coating to provide the colored coating used to coat the optical fiber. In this manner, according to embodiments of the invention, the color concentrate reservoirs are much smaller in size than is required in conventional systems.

For example, to coat optical fiber drawn from a 1 megameter preform (i.e., a preform from which one thousand kilometers of optical fiber are drawn), the reservoir needs to hold only approximately 4 kilograms of color concentrate. By comparison, in conventional systems, each reservoir must be large enough to hold approximately 25 kilograms of color coating. According to embodiments of the invention, the smaller reservoir size makes the overall system 10 more compact and less expensive. The use of relatively compact reservoirs is particularly advantageous when using pressurized reservoirs, which typically would be needed when using a mass flow controller or a needle valve for color concentrate flow regulation. Pressurized reservoirs are relatively heavy and expensive, thus they should be as small as possible for cost reasons. Also, having smaller reservoirs allows for a more compact system, which is advantageous in terms of system portability, which will be discussed in greater detail hereinbelow.

The first reservoir 12 is connected through a first feed line 22 and a first valve 24 and the second reservoir 14 is connected through a second feed line 26 and a second valve 28 to a common feed line 32. The common feed line 32 is connected to a flow controller 34. The flow controller 34 is any suitable type of flow controller, e.g., a positive-displacement pump, a reciprocating pump, a metering pump, or a mass flow-controller. The flow controller 34 controls the flow of the color concentrate and thus the amount of color concentrate delivered to a color concentrate feed line 36.

The color concentrate feed line 36 is connected through a third valve 38 to a coating die feed line 42, which is connected to a coating die 44. Also connected to the coating die feed line 42 is a coating feed line such a secondary coating feed line 46 through a fourth valve 48. The speed of the flow controller 34 is controller or adjusted to be proportionate to the draw speed of the optical fiber draw tower. In this manner, the flow controller 34 delivers a constant amount of color concentrate to be mixed with the coating to provide to the coating die 44 a color coating having a constant color concentration. The constant color concentration of the color coating mixture allows for a uniform thickness of colored coating to be applied to optical fiber passing through the coating die 44.

According to embodiments of the invention, the reservoirs 12, 14, the flow controller 34 and the other components of the color concentrate delivery system 10 are mountable to a mobile platform or substrate, such as a wheeled cart 52. In this manner, the system 10 can be moved between various locations, e.g., between various fiber draw towers. The transportability of the color concentrate delivery system 10 provides greater flexibility to existing fiber manufacturing facilities. For example, in a given fiber manufacturing facility, each draw tower would be capable of drawing and coloring optical fibers of any suitable color. However, conventional arrangements typically require a separate feed line for each color, thus each draw tower only may be able to draw optical fiber of a single color at any given time.

Figure 2A:
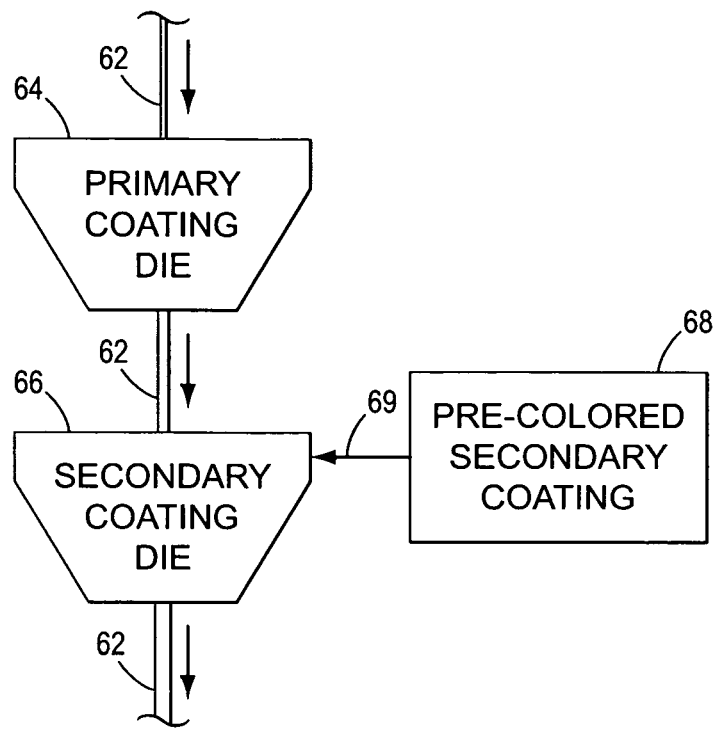
FIG. 2a is a simplified, schematic diagram of a conventional optical fiber coating arrangement.

Conventional fiber coloring techniques use a pre-colored secondary coating. See, e.g., FIG. 2a, in which a simplified schematic diagram of a conventional fiber coloring arrangement is shown. The optical fiber 62 passes through a primary coating die 64 that applies a colorless primary coating to the optical fiber. Then, the optical fiber 62 passes through a secondary coating die 66 that applies a secondary coating to the primary coating. The secondary coating die is supplied with a pre-colored secondary coating (shown as 68) through a colored coating feed line 69. The color-coated optical fiber then passes through a curing device (not shown) that cures the primary and secondary coatings.

Figure 2B:
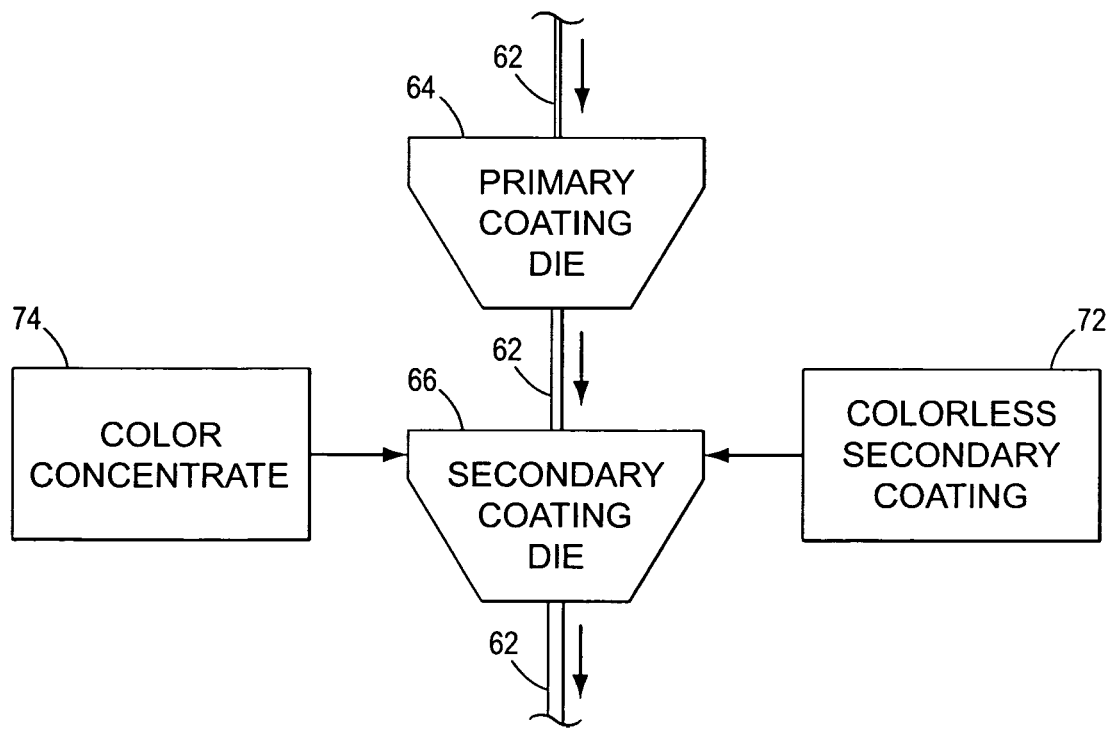
FIG. 2b is a simplified, schematic diagram of an optical fiber coating arrangement according to embodiments of the invention.

By comparison, as shown in FIG. 2b, according to embodiments of the invention, the secondary (or primary) coating die is supplied by a colorless coating (shown as 72) and a color concentrate (shown as 74). Depending on the delivery scheme of the secondary coating and the color concentrate, the color concentrate is delivered via the coating die 66 as a separate layer on top of the secondary coating or, alternatively, as a separate layer between the primary coating layer and the secondary coating layer. Also, according to alternative embodiments of the invention, the color concentrate is controllably mixed with the colorless secondary coating to form a colored secondary coating that is delivered as a colored secondary coating layer on the primary coating layer.

Mixing the color concentrate with the secondary coating directly in the coating die, rather than pre-mixing the secondary coating, reduces reservoir space requirements, as color concentrate reservoirs are much smaller than reservoirs for pre-mixed color coatings. Also, the portability of the system 10 provides a number of advantages over conventional arrangements, as discussed hereinabove.

Figure 3:
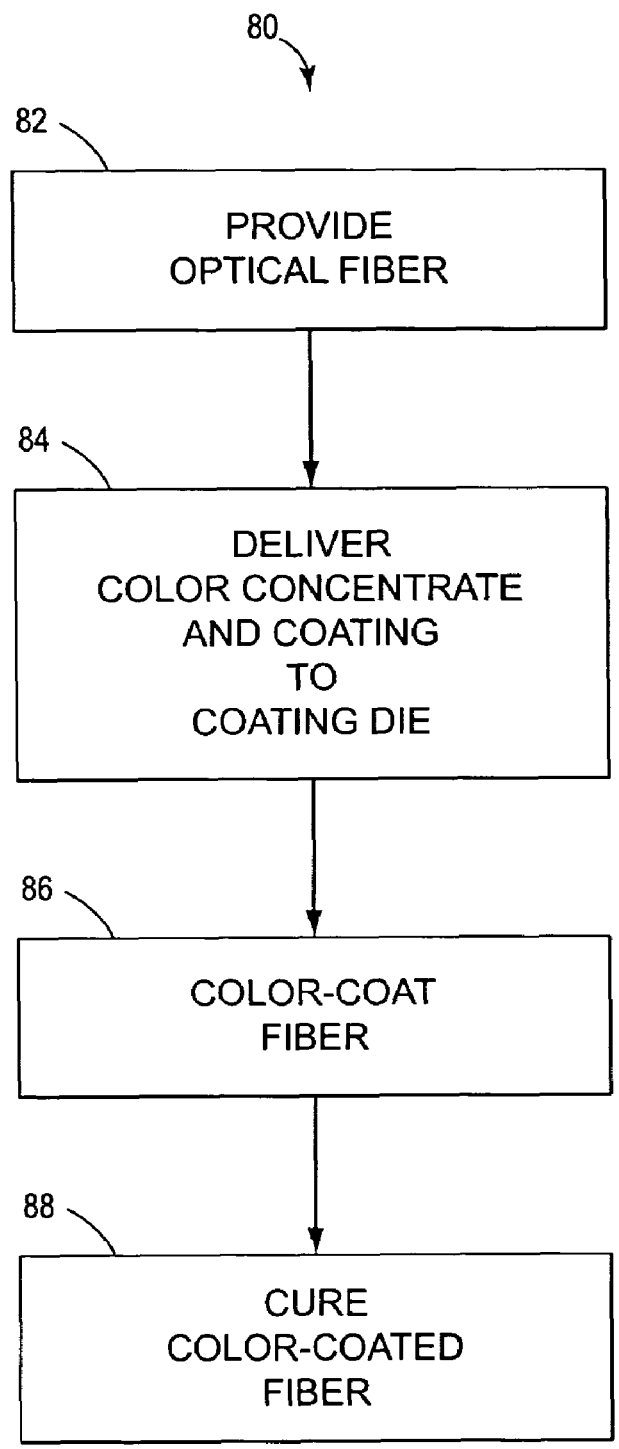
FIG. 3 is a simplified block diagram of a method for color-coating optical fiber according to embodiments of the invention.

Referring now to FIG. 3, shown is a simplified block diagram of a method 80 for color-coating optical fiber according to embodiments of the invention. One step 82 of the method 80 is to provide an optical fiber having a core region and a cladding region. As discussed hereinabove, optical fiber draw from a preform includes a core region and a cladding region. The glass fiber is to be coated with one or more coatings, e.g., a primary coating and a secondary coating.

Another step 84 of the method 80 is to controllably flow a color concentrate and a coating into a coating die. As discussed hereinabove, the flow controller or other suitable device delivers color concentrate at a desired, controlled rate along with conventional coating material to a coating die. The color concentrate and the coating material mix to form a colored coating. For example, as shown in FIG. 1, the color concentrate is mixed with the secondary coating material to provide a colored secondary coating on the optical fiber. However, according to embodiments of the invention, the color concentrate can be mixed with any coating material, e.g., primary coating material, secondary coating material, tertiary coating material or some other coating material.

Another step 86 of the method 80 is to coat the optical fiber with a colored coating. As optical fiber passes through the coating die, a colored coating is applied to the optical fiber. Another step 88 of the method 80 is to cure the color-coated optical fiber. Typically, the coating is a UV-curable coating material, and the coating is cured by passing the coated optical fiber through a curing device such as a UV source device.

It will be apparent to those skilled in the art that many changes and substitutions can be made to the embodiments of the invention herein described without departing from the spirit and scope of the invention as defined by the appended claims and their full scope of equivalents.

The invention claimed is:

1. A system for coating optical fiber with a colored coating, the apparatus comprising:
   a plurality of color concentrate reservoirs, each color concentrate reservoir containing color concentrate;
   a flow rate controller operably connected to at least one of the color concentrate reservoirs through only one single feed line to control the flow of color concentrate out of the color concentrate reservoirs through only one single feed line, the flow rate controller including only one single color concentrate feed line that connects with a coating line to a coating die feed line; and
   a mobile cart dimensioned to hold the plurality of color concentrate reservoirs and the flow rate controller, wherein each reservoir along with an associated scale is supported on a first surface of the mobile cart, wherein each scale is positioned below its respective reservoir and acts as a level sensor for sensing a level of color concentrate in its respective reservoir, and wherein a second surface of the mobile cart supports and holds the flow controller thereon, wherein the mobile cart transports the plurality of color concentrate reservoirs and the flow rate controller to an appropriate location for providing the color concentrate to the coating die feed line,
   wherein the flow rate controller controls the amount of color concentrate delivered to the only one single color concentrate feed line and mixes with coating from the coating line to form a colored coating which is delivered to the coating die feed line which supplies the colored coating to the coating die for coating an optical fiber with the colored coating.

2. The apparatus as recited in claim 1, wherein the flow rate controller further comprises a positive-displacement pump.

3. The apparatus as recited in claim 1, wherein the flow rate controller further comprises a reciprocating pump.

4. The apparatus as recited in claim 1, wherein the flow rate controller further comprises a metering pump.

5. The apparatus as recited in claim 1, wherein the flow rate controller is a mass-flow controller.

* * * * *